United States Patent [19]
Miller

[11] 3,837,685
[45] Sept. 24, 1974

[54] PIPE EXPANSION AND REPAIR FITTING

[76] Inventor: John H. Miller, Rt. 4 Box 300, Manitowoc, Wis. 54220

[22] Filed: Jan. 2, 1973

[21] Appl. No.: 320,168

[52] U.S. Cl. .................. 285/45, 138/97, 285/226, 285/300, 285/423, 285/DIG. 22
[51] Int. Cl. ............................................. F16l 55/18
[58] Field of Search ............ 285/45, 300, 301, 226, 285/423, DIG. 22, 222, 332, 227, 228, 229; 138/97

[56] References Cited
UNITED STATES PATENTS

| | | | |
|---|---|---|---|
| 247,591 | 9/1881 | White | 285/300 |
| 1,208,417 | 12/1916 | Waidlich | 285/45 X |
| 1,213,906 | 1/1917 | Ray | 285/301 X |
| 1,786,506 | 12/1930 | Ray | 285/301 X |
| 3,243,206 | 3/1966 | Samer | 285/DIG. 22 |
| 3,413,021 | 11/1968 | Potts | 285/322 X |

FOREIGN PATENTS OR APPLICATIONS

| | | | |
|---|---|---|---|
| 342,692 | 10/1921 | Germany | 285/226 |
| 658,505 | 10/1951 | Great Britain | 285/226 |

OTHER PUBLICATIONS

Croll-Reynolds Engineering Co. Bulletin-62, "Flexo Disc and FlexoLeed", 4 pp., Rec'd. 12-24-64.

*Primary Examiner*—Jordan Franklin
*Assistant Examiner*—Moshe I. Cohen
*Attorney, Agent, or Firm*—Alter Weiss Whitesel & Laff

[57] ABSTRACT

A pipe expansion and repair fitting wherein the component parts are of plastic or the like. The component parts comprise a bellows arrangement having tapered tubular ends for fitting around and connecting two ends of the pipe and being extended or repaired. A flow tube assembled in the bellows reduces turbulence. A telescoping shield protects the bellows from the adverse effects of the surrounding environment.

4 Claims, 5 Drawing Figures

PATENTED SEP 24 1974  3,837,685

PIPE EXPANSION AND REPAIR FITTING

This invention relates to pipe expansion and repair fittings and more particularly to pipe fittings with dirt shields disposed thereon.

A prime object of the invention is to provide permanent heat fused repair joints for pipe lines, constructed of plastic or the like. The pipelines may be used underground or above ground.

Another object of the invention is to provide devices of the character described. The fitting described herein minimizes the number of additional fittings necessary on a pipeline. The necessity for excavating long sections of the pipeline which at times is quite difficult is minimized.

Still another object of the invention is to provide fittings forming a part of a plastic pipeline, to absorb the expansion and contraction thereof.

A further object of the invention is to provide devices designed to relieve strains and stresses on the pipeline, caused by the conventional "plowing-in" process.

Still further, an object is to provide fittings producing full opening branches in the pipeline.

Another object is to provide devices having integral flow tubes disposed therein, to minimize turbulence of the fluid flowing through the fitting.

Still another object is to provide fittings having bellows that are shielded by a self-adjustable outer guard.

The device illustrated, described and claimed herein, shows a repair fitting, constructed of plastic, or the like, that may be fused to an underground or above ground pipeline. The fitting is equipped with an internal flow tube, and a pliable bellows, guarded by a slidable, self-adjustable outer shield.

Other and further objects of the invention will become more apparent as the description proceeds, when taken in conjunction with the drawings, in which.

Similar characters of reference indicate corresponding parts and features, throughout the several views, and referring now to the same, the character 10, shows a tubular bellows that is molded of plastic, or any other pliable material, applied to a conventional pipeline, shown in phantom as 11.

Figure 4:
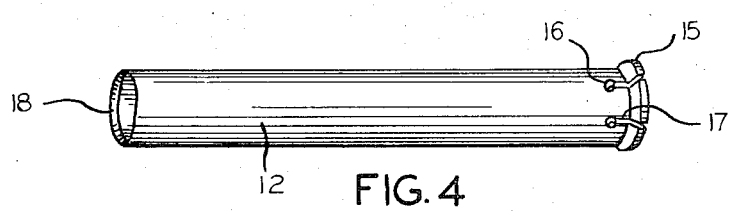
FIG. 4 is a perspective view of the flow-tube.
Figure 5:
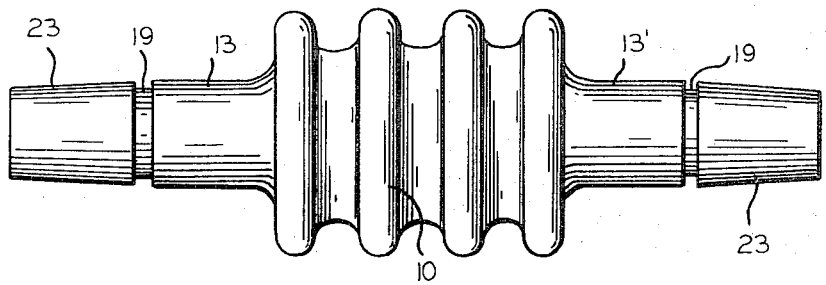
FIG. 5 is a view of the pliable bellows forming an expandable fitting.

There is a flow-tube 12 inserted in the tubular portions 13 and 13' on the ends of the bellows 10. The one end 13' of the bellows 10, is shown provided with an inside circular recess 14, to accomodate the ridge 15 on one end of the flow-tube 12, (see FIGS. 1 and 4). This end of the flow-tube 12 is shown with a plurality of apertures 16, and a corresponding number of slots 17, to permit the flow-tube 12 to be inserted into the end 13' of the bellows 10, with the ridge 15 disposed in the recess 14 (see FIG. 1). The inner diameter of the one end 13' may be slightly larger than the inner diameter of the other end 13 to facilitate inserting the flow tube into the bellows section. Alternatively, the flow tube 12 may be tapered so that its outer diameter at one end; ie., the end that is inserted into bellows end 13 is of slightly smaller diameter than the other end of the flow tube.

The other end of the flow-tube 12, has an inwardly extending chamfered edge 18, to permit an unobstructed flow of the liquid passing through the pipeline 11 and the flow-tube 12.

Figure 1:
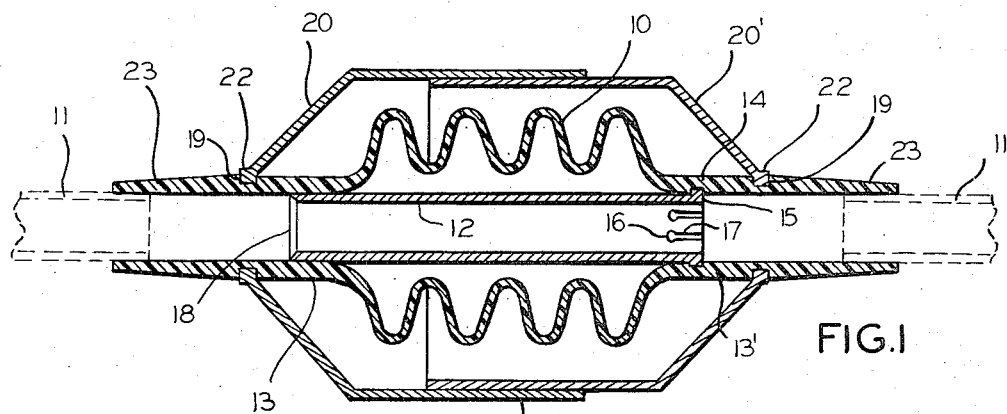
FIG. 1 is a cross-sectional view of the entire assembled device, attached to the pipeline, shown in phantom.
Figures 2, 3:
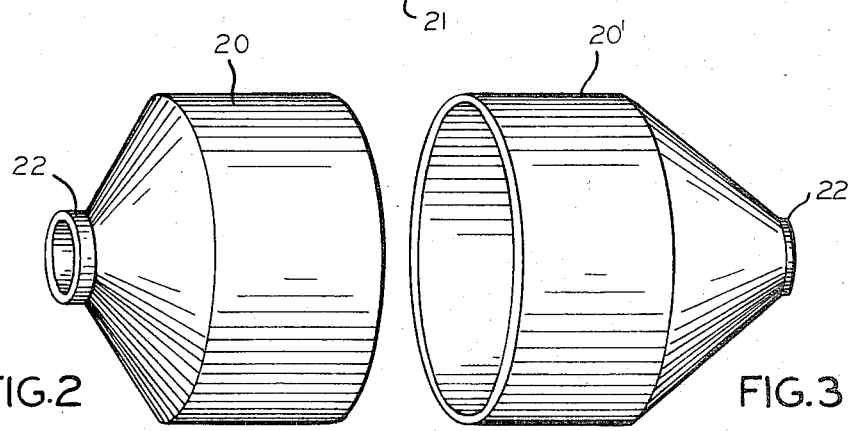
FIG. 2 is a perspective view of one section of the protective shield.
FIG. 3 is a perspective view of another section of the protective shield, designed for telescopic engagement with the shield section shown in FIG. 2.

The outer peripheral surface of the ends 13 and 13' of the bellows 10, are provided with circular recesses 19, to accomodate mounting a pair of protective shields 20 and 20', which shields telescopically engage one another, as shown at 21 in FIG. 1.

The conical tapered portions of the shields 20 and 20' are provided with beaded ridges 22, which may be of any conventional design, for engagement with and into the circular recesses 19 on the face of the ends 13 and 13' of the bellows 10. To enable the shields 20 and 20' to be easily applied to the ends 23 of the bellows 10, the ends of the bellows are tapered on their outer peripheral surface.

In use then, the disclosed pipe expansion and repair fitting can be easily applied to a pipe at a point of fracture. The broken pipe is merely cut at both sides of the leak and the described fixture is applied. Thus, it is no longer necessary to remove a complete section of pipe between fittings to accomplish the repair.

From the above description it will become manifest to anyone familiar with the art, that the device is designed to perform the purpose for which it is intended, and may be easily applied without special mechanical skill, or equipment. It is simple in construction, and may be designed to fit any conventional pipeline.

Although I have shown a specific construction, I am fully cognizant of the fact that many changes may be made in the parts and features, without effecting their operativeness, and I reserve the rights to make such changes as I may deem convenient, without departing from the spirit of my invention, or the scope of the appended claims.

Having thus described the invention, what I claim and desire to secure by Letters Patent in the United States, is:

1. A pipe expansion and repair fitting for extending or repairing pipelines,
   said fitting comprising a bellows arrangement,
   said bellows arrangement including a central bellows section having first and second tubular ends for fitting around and connecting to ends of the pipeline being extended or repaired,
   flow tube means having first and second ends internally bridging the bellows section of said bellows arrangement to reduce turbulence of the bellows between the ends of the pipe,
   an internal recess at the second tubular end proximate to the bellows section of said bellows arrangement,
   a ridge at the first end of said flow tube means lockingly fitting into said recess and affixing said flow tube means into said bellows arrangement bridging said bellows section,
   the tubular ends of said bellows arrangement each having an external recess therein,
   a guard shell surrounding said bellows for protecting the bellows against the adverse effects of the surrounding environment, and beaded ridges at each end of said guard shell fitting into said external recess and locking said guard shell in place.

2. The pipe expansion and repair fitting of claim 1 wherein the inner diameter of the first tubular end of said bellows arrangement at the junction of the bellows section and the first tubular end is smaller than the inner diameter at the junction of the bellows section and the second tubular end, whereby the insertion of the flow tube means is facilitated.

3. The pipe expansion and repair fitting of claim 1 wherein said first end of said flow tube has peripheral longitudinal slots to enable resilient reduction of the outer diameter of said flow tube.

4. The pipe expansion and repair fitting of claim 1 wherein said guard shell comprises first and second telescoping portions.

* * * * *